United States Patent [19]

Güttner

[11] Patent Number: 4,713,688

[45] Date of Patent: Dec. 15, 1987

[54] METHOD FOR INCREASING RESOLUTION IN A COMPATIBLE TELEVISION SYSTEM

[75] Inventor: Eckhard Güttner, Dortmund, Fed. Rep. of Germany

[73] Assignee: ANT Nachrichtentechnik GmbH, Backnang, Fed. Rep. of Germany

[21] Appl. No.: 779,599

[22] Filed: Sep. 24, 1985

[30] Foreign Application Priority Data

Sep. 26, 1984 [DE] Fed. Rep. of Germany ....... 3435265

[51] Int. Cl.$^4$ .............................................. H04N 7/00
[52] U.S. Cl. .................................................... 358/141
[58] Field of Search .................................. 358/12, 141

[56] References Cited

U.S. PATENT DOCUMENTS

| 4,485,401 | 11/1984 | Tan et al. | 358/12 |
| 4,620,225 | 10/1986 | Wendland et al. | 358/141 |
| 4,621,286 | 11/1986 | Reitmeier et al. | 358/141 |

FOREIGN PATENT DOCUMENTS

| 146713 | 7/1985 | European Pat. Off. | 358/12 |
| 3344524 | 6/1985 | Fed. Rep. of Germany | 358/12 |
| 190085 | 9/1985 | Japan | 358/12 |

OTHER PUBLICATIONS

Broder Wendland, "SMPTE, Winter Conference; Feb. 6–7, 1981; TV Technology in the 80's"; pp. 151–165, Scarsdale/New York.

B. Wendland, "Zur Theorie der Bildabtastung", ntz Archiv Bd. 4 (1982), H. 10; pp. 293–301.

H. Schröder et al., "Planare VOR–und Nachfilterung für Fernsehsignale", ntz Archiv Bd. 4 (1982) H. 10; pp. 303–312.

*Primary Examiner*—John W. Shepperd
*Attorney, Agent, or Firm*—Spencer & Frank

[57] ABSTRACT

A method for increasing image resolution in a compatible television system, in which system an optical image is scanned along vertically spaced horizontal raster lines by a high definition television camera, the resulting picture signal is subjected to a horizontal frequency band limitation for transmission over a transmission channel having a given bandwidth. The method includes:

sampling the resulting picture signal in the direction of horizontal frequencies in the spatial domain with a horizontal sample spacing corresponding to the vertical spacing between adjacent lines of the resulting picture signal;

effecting two-dimensional filtering of the sampled picture signal with respect to two mutually transverse diagonals of the scanned image;

offset modulating the filtered picture signal and band limiting the filtered picture signal to the bandwidth of the transmission channel, to produce a modified picture signal containing components capable of causing interference in a compatible receiver; and imparting to the components capable of causing interference a relatively reduced amplitude.

3 Claims, 22 Drawing Figures

FIG. 10
FIG. 11
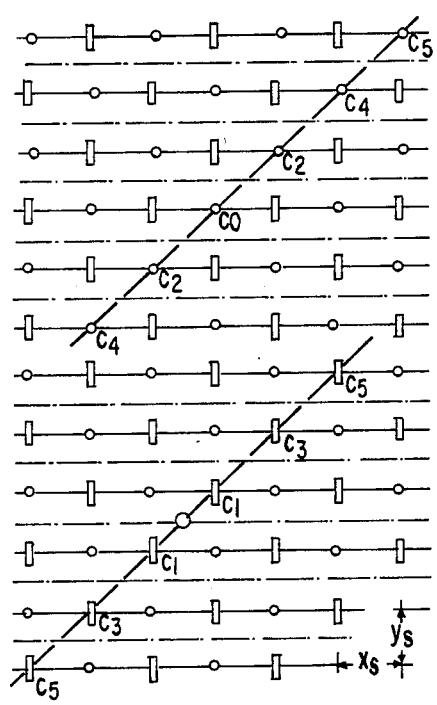
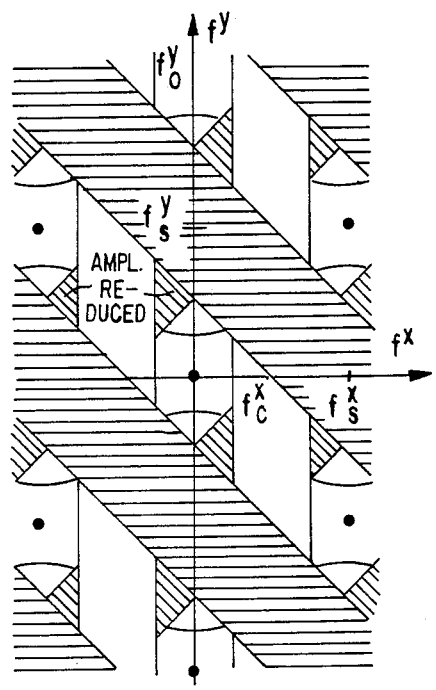
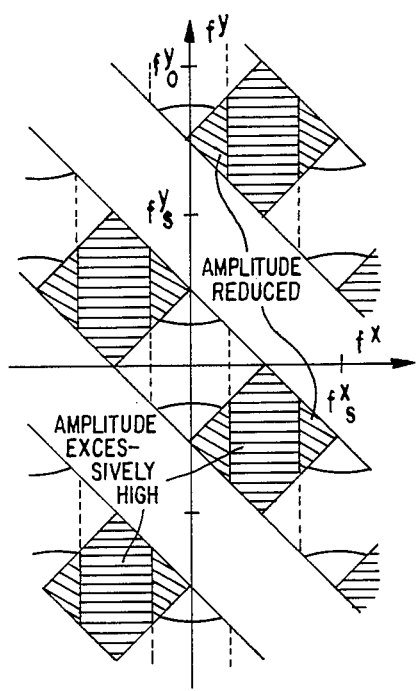
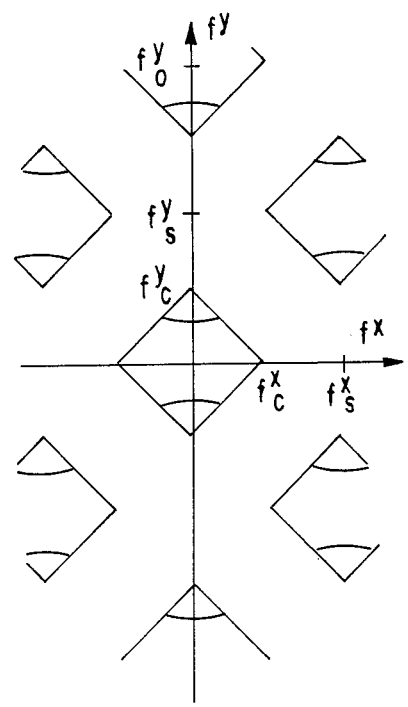
FIG. 2
FIG. 13

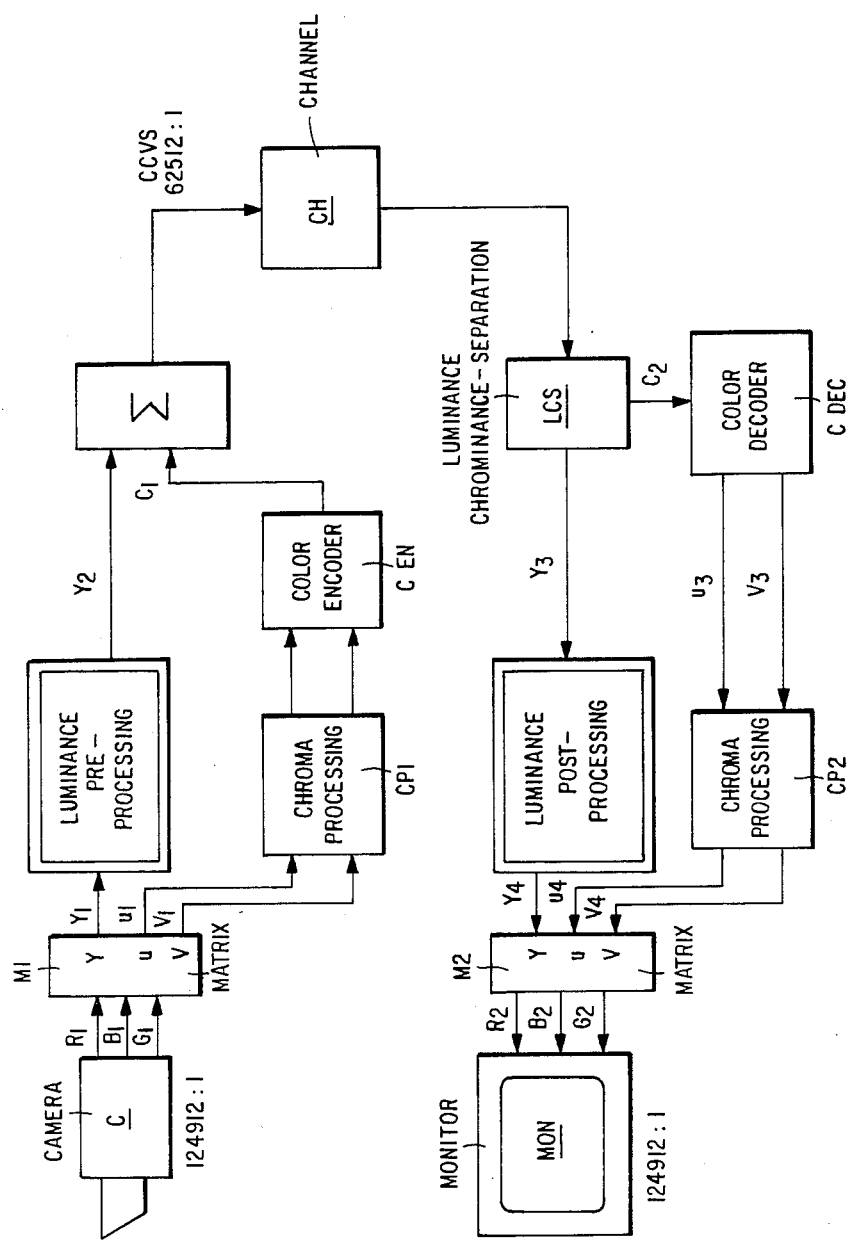

METHOD FOR INCREASING RESOLUTION IN A COMPATIBLE TELEVISION SYSTEM

BACKGROUND OF THE INVENTION

The present invention relates to a method for increasing resolution in a compatible television system, such as described, for example, in European Pat. No. 57,826.A2.

The use of digital signal processing devices such as digital filters, digital real time memories, etc., in conjunction with offset transmission, offers the possibility of transmitting a television picture signal with significantly improved horizontal resolution and to reproduce it without edge flicker and with the same resolution in the direction of horizontal and vertical frequencies $f^x$, $f^y$ in the spatial frequency domain.

The frequencies $f^x$ and $f^y$ define a frequency plane which relates to spatial frequencies for the modulation process. The $f^x$-spectrum corresponds to the x-axis and the $f^y$-spectrum to the y-axis relative to the two dimensional Fourier transform. X and y-axes correspond to the coordinates of the television picture to be processed.

The publications entitled "SMPTE, Winter Conference, Feb. 6-7, 1981, TV Technology in the 80's", pages 151-165, Scarsdale/N.Y., "ntz Archiv", Volume 4, 1982, No. 10, pages 293-301 and "ntz Archiv", Volume 4, 1982, No. 10, pages 303-312, describe measures for scanning pictures in conjunction with suitable filtering to assure improved horizontal resolution with the best possible assurance of compatibility with existing standards.

SUMMARY OF THE INVENTION

It is an object of the present invention to provide a method which permits suitable and economical digital signal processing while maintaining compatibility with existing transmission systems.

The above and other objects are achieved, according to the invention, by a method for increasing image resolution in a compatible television system, in which system an optical image is scanned along vertically spaced horizontal raster lines by a high line number television camera, the resulting picture signal is subjected to a a horizontal frequency band limitation for further digital processing, the method comprising:

sampling the resulting picture signal in the direction of horizontal frequencies in the spatial domain with a horizontal sample spacing corresponding to the vertical spacing between adjacent lines of the resulting picture signal;

effecting two-dimensional filtering of the sampled picture signal with respect to two mutually transverse diagonals of the scanned image;

offset modulating the filtered picture signal and band limiting the filtered picture signal to the bandwidth of the transmission channel; to produce a modified picture signal containing components capable of causing interference in a compatible receiver; and imparting to the components capable of causing interference a relatively reduced amplitude.

The present invention has as one advantage that the method can be used independently of whether the optical image is scanned according to the line interlace method or in successive adjacent lines, i.e. not interlaced. Thus, the method according to the invention can be used for standardized film scanning as well as for television picture scanning. Moreover, the costs for digital processing are low. As will be shown below, the two-dimensional filtering in the diagonal directions can be effected already with a 625-line signal at the filter input, e.g. with one field from a high definition line interlace camera, which considerably reduces processing circuit expenditures.

The present invention will now be described in greater detail with reference to the drawings.

BRIEF DESCRIPTION OF THE DRAWINGS

FIG. 10 shows planar filtering at the receiver with calculation of the input raster (upper region) and the intermediate raster (lower region).

FIG. 11 shows the spatial frequency domain spectrum after the first diagonal filtering at the receiver (stop bands of the diagonal filter are shown in hatching).

FIG. 12 shows the spatial frequency domain spectrum at the output of the first diagonal filter at the receiver subsequent to offset demodulation.

FIG. 13 shows the spatial frequency domain spectrum at the output of the second diagonal filter at the receiver.

FIG. 20 shows the processing of color components in accordance with this invention.

DESCRIPTION OF THE PREFERRED EMBODIMENTS

The discussion below is based on a 625-line transmission system and on a high line number camera which scans the optical image in 1250 lines. In principle, all statements below are also applicable to other transmission systems, such as, for example, the American 525-line transmission systems employing a corresponding 1050-line camera.

Figure 1:
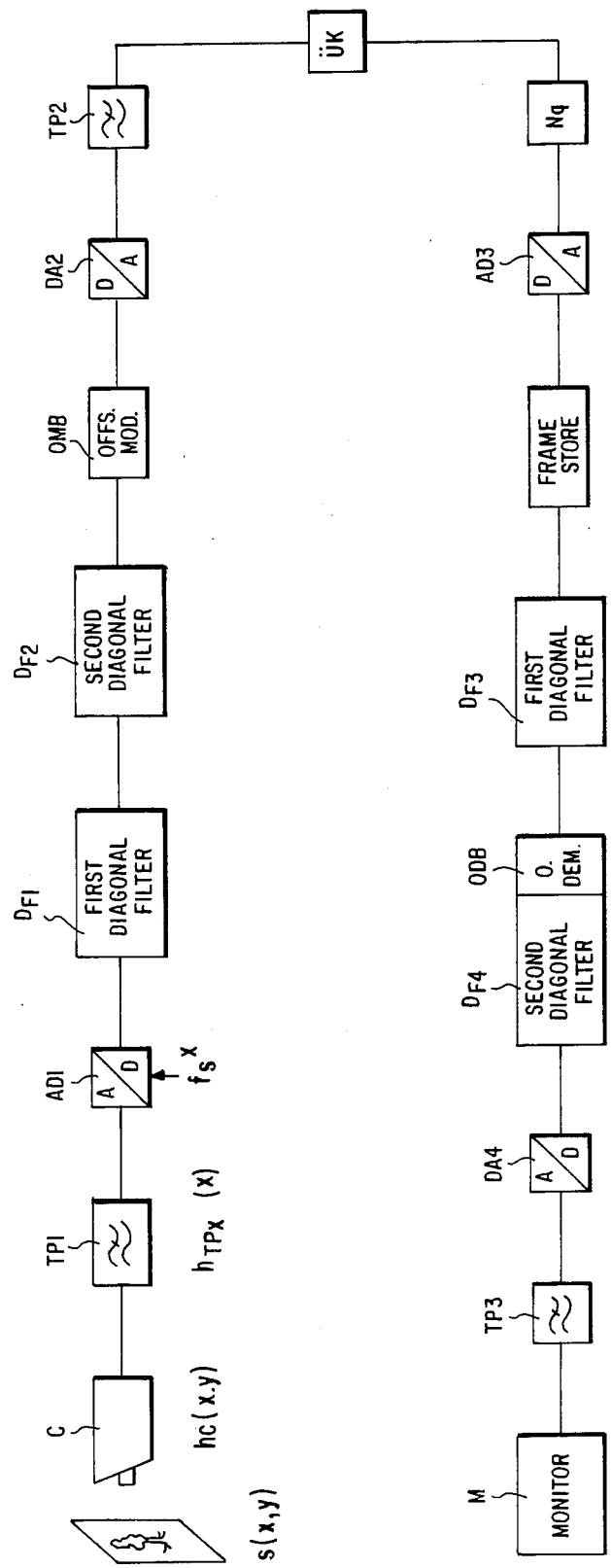
FIG. 1 is a block circuit diagram of digital signal processing circuitry according to the invention at a transmitter and at a receiver.

In FIG. 1, an optical image lying in a plane having axes x and y so that each image point has a positon defined by x and y coordinates and the image is denoted s(x, y) is scanned along vertically spaced horizontal lines and thus vertically sampled by a camera C providing a two-dimensional pulse response $h_c(x,y)$ and is horizontally limited in its bandwidth by a lowpass filter TP1 providing a one dimensional horizontal pulse response $h_{TPx}(x)$ in the spatial domain. The horizontal bandwidth limitation is effected at the horizontal spatial frequency $f^x = f_c{}^x \triangleq 16$ MHz. The principle of signal processing within the system discussed below is described in the spatial domain (x,y-plane), e.g. s(x,y), as well as in the spatial frequency domain ($f^x$, $f^y$-plane), e.g. $S(f^x, f^y)$. Functions defined in the spatial domain are related to their corresponding spectra in the spatial frequency domain by the two-dimensional Fourier transform (denoted by $\stackrel{2}{\circ\!\!-\!\!\bullet}$ )

$$s(x,y) \stackrel{2}{\circ\!\!-\!\!\bullet} S(f^x,f^y) = \int_{-\infty}^{\infty} \int_{-\infty}^{\infty} s(x,y) e^{-j2\pi f^x x} e^{-j2\pi f^y y} dx\, dy$$

A one-dimensional function s(x) leads to the relation $s(x) \to \delta(y)s(x) \stackrel{2}{\circ\!\!-\!\!\bullet} S(f^x,f^y) = S(f^x)$, where $\delta(y)$ is the delta function. $\delta(y)$ respresents a line singularity along the x-axes (y=o) with the property $$\int_{-\infty}^{\infty} \delta(y) s(y) = s(o)$$

(one-dimensional)

as $\int_{-\infty}^{\infty} \int_{-\infty}^{\infty} \delta(x)\delta(y)s(x,y)dx\,dy = s(o,o)$ (two-dimensional)

$\delta(x)$ is a line singularity along the y-axes (x=o). The product $\delta(x)\delta(y)$ defines a point singularity at the origin (x=o, y=o) of the spatial domain.

In the spatial domain a system is characterized by its pulse response or delta response h(x), h(x,y), in the spatial frequency domain by the corresponding transfer function $H(f^x)$, $H(f^x,f^y)$ $h(x) \stackrel{1}{\circ\!\!-\!\!\bullet} H(f^x)$ $h(x,y) \stackrel{2}{\circ\!\!-\!\!\bullet} H(f^x,f^y)$ By means of the convolution integral the response of a system with delta response h(x), h(x,y) to an arbitrary signal s(x), s(x,y) at its input can be calculated.

$$b(x) = \int_{-\infty}^{\infty} s(x')h(x-x')dx'$$

$$= s(x) * h(x)$$

$$b(x,y) = \int_{-\infty}^{\infty} \int_{-\infty}^{\infty} s(x',y')h(x-x',y-y')dx'dy'$$

$$= s(x,y) ** h(x,y)$$

The equivalent description in the spatial frequency domain is $B(f^x) = S(f^x) \cdot H(f^x)$ $B(f^x,f^y) = S(f^x,f^y) \cdot H(f^x,f^y)$ $b(x) = s(x) * h(x) \quad \stackrel{1}{\circ\!\!-\!\!\bullet} B(f^x) = S(f^x) \cdot H(f^x)$ $b(x,y) = s(x,y) ** h(x,y) \stackrel{2}{\circ\!\!-\!\!\bullet} B(f^x,f^y) = S(f^x,f^y) \cdot H(f^x,f^y)$ $b(x) = s(x) \cdot h(x) \quad \stackrel{1}{\circ\!\!-\!\!\bullet} B(f^x) = S(f^x) * H(f^x)$ $b(x,y) = s(x,y) \cdot h(x,y) \stackrel{2}{\circ\!\!-\!\!\bullet} B(f^x,f^y) = S(f^x,f^y) ** H(f^x,f^y)$ further definitions:
- $y_s$: vertical line spacing of a 625-line picture
- $f_s{}^y = 1/y_s$: corresponding sampling frequency
- $y_c = 2y_s$: line spacing in a field of a 625-line, 2:1, picture
- $f_c{}^y = 1/y_c = \frac{1}{2}f_s{}^y$: corresponding sampling frequency
- $|f^y| < f_c{}^y$: range of vertical spatial frequencies theoretically transmissible in a system with vertical sampling frequency $f_s{}^y$
- $y_o = y_s/2$: line spacing of a 1250-line picture
- $f_o{}^y = 2f_s{}^y$: corresponding sampling frequency
- $x_s$: horizontal spacing of samples after A/D conversion here $|x_s| \approx |y_s|$
- $f_s{}^x = 1/x_s$ corresponding horizontal sampling frequency $x_c = 2x_s$; $f_c{}^x = 1/x_c = \frac{1}{2}f_s{}^x$; $x_o = \frac{1}{2}x_s$; $f_o{}^x = 1/x_o = 2f_s{}^x$ The delta response $h_c(x,y)$ of the camera C describes the influence of the optical system and the scanning spot of the camera pickup tube.

An analog low-pass filtering of the line-sequential video signal at the camera output corresponds to a low-pass band limitation of the signal spectrum in the direction of horizontal frequencies $f^x$ of the spatial frequency domain.

After horizontal bandwidth limitation, the 625-line picture signal can then be expressed as follows for the spatial domain:

$$b_{1s}(x,y) = (s(x,y)  h_c(x,y)  h_{TPx}(x)\delta(y)) \cdot \text{Ш}_{y_s}(y) \tag{1a}$$

where $\text{Ш}_{y_s}(y)$ represents the delta-pulse train for an n-line system with $y_s$ line spacing.

Equation (1a) describes the picture signal at the output of analog low-pass filter TP1 in the spatial domain (spatial windowing caused by the fixed picture format is disregarded). The picture scanning is described as vertically sampling of the picture, assuming that the sampling of one line is performed at one vertical position, leading to the multiplication with $$\text{III}_{ys}(y) = \sum_{n=-\infty}^{\infty} \delta(y - n \cdot y_s),$$

a series of line singularities at $y = n \cdot y_s$. The spectrum of this delta-pulse train is $$\text{III}_{ys}(y) \stackrel{\circ}{\rightharpoondown} \delta(f^x) f_s^y \text{III}_{f_s^y}(f^y) = \delta(f^x) f_s^y \sum_{m=-\infty}^{\infty} \delta(f^y - m f_s^y),$$

a series of point singularities along the $f^y$-axes ($f^x = 0$) with $f_s^y$ / spacing.

In the frequency domain, the following equation then applies for this picture signal:

$$B_{\perp s}(f^x, f^y) = (S(f^x, f^y) \cdot H_c(f^x, f^y) \cdot H_{TPx}(f^x)) ** \delta(f^x) f_s^y \text{III}_{f_s^y}(f^y) \tag{1b}$$

Equation (1b) is obtained by applying the two-dimensional Fourier transform to the terms of equation (1a).

Figure 2:
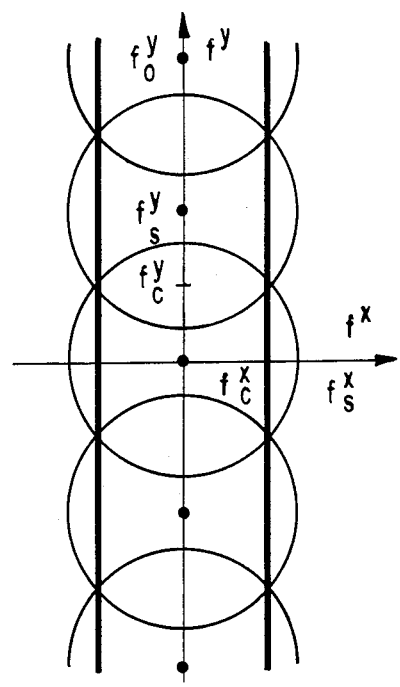
FIG. 2 shows the spatial frequency domain spectrum of a 625-line field of a high definition camera with horizontal bandwidth limitation to $f_c^x$.

Thus, in the direction of the vertical spatial frequencies there results a periodic repetition of the horizontally band limited picture signal, filtered by the camera transfer function $H_c(f^x, f^y)$, at multiples of the vertical sampling frequency of the 625-line system $f_s^y$ (FIG. 2). The vertical aliasing error contained in the signal due to the overlapping of the periodic spectra can of course no longer be eliminated even by subsequent filtering.

The circles in FIG. 2 show the pass-band of the camera transfer function $H_c(f^x, f^y)$ which is assumed to be rotationally symmetrical. Aliasing error occurs, because the signal spectrum is not band limited to half the sampling frequency $f_c^y = \frac{1}{2} f_s^y$ prior to the sampling process, e.g. with an input picture signal spectrum containing vertical frequency components at $f^y 1 = +(f_c^y + \Delta f^y) > f_c^y$ and $f^y 2 = -(f_c^y + \Delta f^y) < -f_c^y$ the signal spectrum at the camera output shows frequency components at $f^y 2 = f_c^y - \Delta f^y < f_c^y$ and $f^y 1 = -(f_c^y - \Delta f^y) > -f_c^y$, due to the periodic repetition of the base-band spectrum at multiples of the vertical sampling frequency $f_s^y$.

Figure 3:
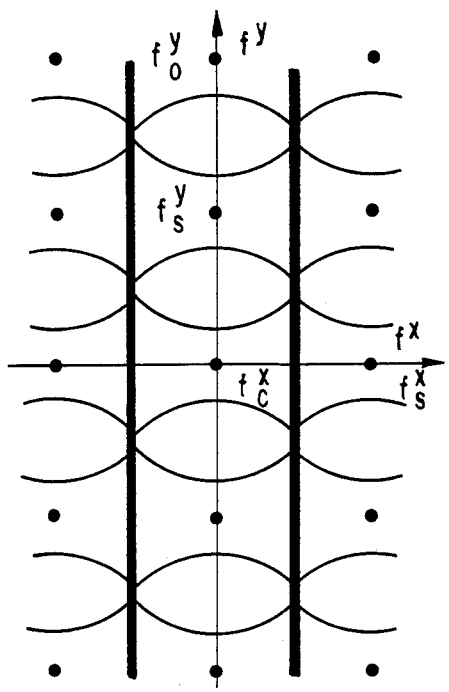
FIG. 3 shows the spatial frequency domain spectrum of FIG. 2 after horizontal sampling with $f_s^x = 2f_c^x$.

As shown in FIG. 1, lowpass filter TP1 is followed by an analog/digital converter AD1 which additionally samples the lowpass filtered picture signal $b_{\perp s}(x, y)$ for further digital processing equation (1c). The sampling frequency $f_s^x = 2f_c^x$ of analog/digital converter AD1 is approximately 32 MHz so that the signal samples relate to image points spaced apart horizontally by a distance $x_s$ which is equivalent to the vertical line spacing $y_s$ between picture lines of a 625-line signal. The picture signal spectrum, which is now periodic also in the direction of horizontal spatial frequencies, due to the horizontal sampling in the spatial domain, is shown in FIG. 3.

$$b_{\text{III}s}(x, y) = b_{\perp s}(x, y) \cdot \text{III}_{xs}(x) \tag{1c}$$

$$= (s(x, y)  h_c(x, y)  h_{TPx}(x) \cdot \delta(y)) \cdot \text{III}_{ys}(y) \text{III}_{xs}(x)$$

The resulting spatial frequency spectrum is $$B_{\text{III}s}(f^x, f^y) = (S(f^x, f^y) \cdot H_c(f^x, f^y) \cdot H_{TPx}(f^x)) ** f_s^x f_s^y \text{III}_{f_s^y}(f^y) \text{III}_{f_s^x}(f^x) \tag{1d}$$

Figure 4:
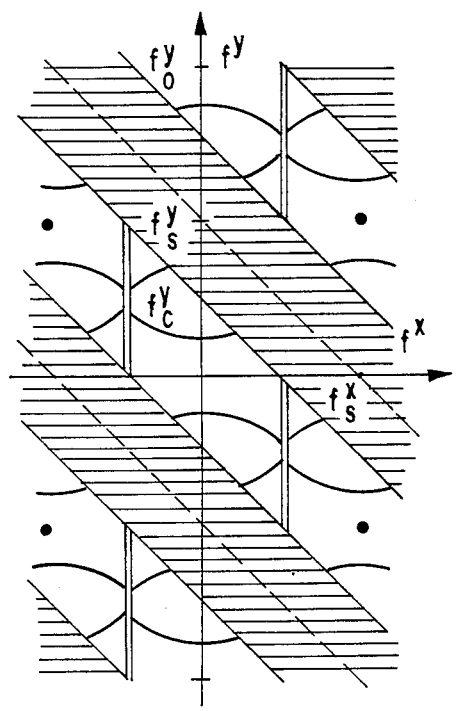
FIG. 4 shows the spatial frequency domain spectrum after the first diagonal filtering at the transmitter.

Two series-connected one-dimensional filters $D_{F1}$ and $D_{F2}$ which operate in orthogonal directions are employed for the subsequent two-dimensional diagonal filtering. FIG. 4 shows the pass-bands of the first diagonal filter $D_{F1}$ (stop bands hatched).

The transfer function $H_{\perp TPd1}(f^x, f^y)$ of this filter can be described by means of a transfer function $H_{TPd1}(f^x, f^y)$, where $H_{TPd1}(f^x, f^y)$ is identical to $H_{\perp TPd1}(f^x, f^y)$ in the base-band region between the dashed lines (FIG. 4) and $H_{TPd1}(f^x, f^y) = 0$ outside this band.

$$H_{\perp TPd1}(f^x, f^y) = H_{TPd1}(f^x, f^y) ** \delta(f^x) f_0^y \text{III}_{f_0^y}(f^y) \tag{2a}$$

$H_{TPd1}(f^x, f^y)$ can be described by means of a one-dimensional transfer function $H_{TPd}(f^x)$ $$H_{TPd1}(f^x, f^y) = H_{TPd}(f^x) \cdot \delta(f^y) ** \delta(f^x + f^y) \tag{2b}$$

and in the spatial, domain:

$$h_{\perp TPd1}(x, y) = h_{TPd1}(x, y) \cdot \text{III}_{y_0}(y) \text{ and} \tag{2c}$$

$$h_{TPd1}(x, y) = h_{TPd}(x) \cdot \delta(x - y)$$

Thus, the sampled values $h_{\perp TPd1}(x, y)$ lie on the diagonal $x = y$ of the spatial domain.

For the transfer function of the second diagonal filter $D_{F2}$, the result is correspondingly:

$$H_{\perp TPd2}(f^x, f^y) = H_{TPd2}(f^x, f^y) ** \delta(f^x) f_0^y \text{III}_{f_0^y}(f^y) \tag{3a}$$

$$H_{TPd2}(f^x, f^y) = H_{TPd}(f^x) \cdot \delta(f^y) ** \delta(f^x - f^y) \tag{3b}$$

$$h_{\perp TPd2}(x, y) = h_{TPd2}(x, y) \cdot \text{III}_{y_0}(y) \text{ and} \tag{3c}$$

$$h_{TPd2}(x, y) = h_{TPd}(x) \cdot \delta(x + y)$$

Figure 5:
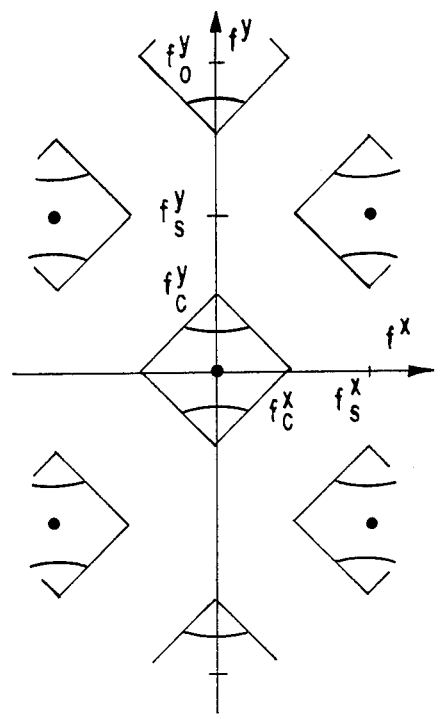
FIG. 5 shows the spatial frequency domain spectrum after the second diagonal filtering at the transmitter.

The signal spectrum after this second filtering is shown in FIG. 5. The base-band spectrum at $|f^x| \leq f_c^x$; $|f^y| \leq f_c^y$, band limited diagonally as desired, appears periodically repeated, with the points of repetition forming the offset raster $D_{\perp o}(f^x, f^y)$. The associated sampling raster $d_{\perp o}(x, y)$ in the spatial domain is a high line number offset raster, $$D_{\perp o}(f^x, f^y) = 2 f_s^x f_s^y \cdot [\text{III}_{f_0^x}(f^x) \cdot \text{III}_{f_0^y}(f^y) + \tag{4a}$$

$$\text{III}_{f_0^x}(f^x - f_s^x) \cdot \text{III}_{f_0^y}(f^y - f_s^y)]$$

$$d_{\perp o}(x, y) = \text{III}_{xs}(x) \cdot \text{III}_{ys}(y) + \text{III}_{xs}(x - x_0) \cdot \text{III}_{ys}(y - y_0) \tag{4b}$$

which can be represented as the sum of two mutually offset 625-line orthogonal rasters.

Figure 6:
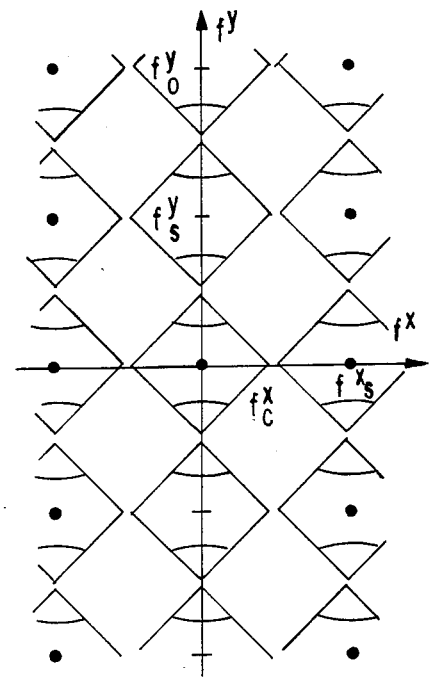
FIG. 6 shows the spatial frequency domain spectrum before digital offset modulation.

For further processing, only the sample values of the first one of the two rasters (4b) are employed. The spatial frequency spectrum resulting therefrom is shown in FIG. 6. The base spectrum now appears periodically repeated at multiples of the horizontal and vertical sampling frequencies $f_s^x$ and $f_s^y$, respectively. Thus there result the same repetition points as for the spectrum of the picture signal before diagonal filtering, but in the diagonal direction the partial spectra are now separated by identically sized signal free regions.

The 625-line orthogonal raster $d_{\perp s}(x, y)$ in the spatial domain can be represented as the sum of two offset-rasters, mutually offset $$d_{\perp s}(x, y) = \text{III}_{xs}(x) \cdot \text{III}_{ys}(y) \tag{5a}$$

$$= \text{III}_{xc}(x) \cdot \text{III}_{yc}(y) + \text{III}_{xc}(x - x_s) \cdot \text{III}_{yc}(y - y_s) +$$

-continued $$\text{III}_{xc}(x) \cdot \text{III}_{yc}(y - y_s) + \text{III}_{xc}(x - x_s) \cdot \text{III}_{yc}(y)$$

The following results for the frequency domain:

$$D_{\perp}(f^x, f^y) = f_s^x f_s^y \cdot \text{III}_{fsx}(f^x) \text{III}_{fsy}(f^y) \quad (5b)$$

$$= 2f_c^x f_c^y \cdot [\text{III}_{fsx}(f^x) \text{III}_{fsy}(f^y) + + \text{III}_{fsx}(f^x - f_c^x) \cdot$$

$$\text{III}_{fsy}(f^y - f_c^y)] + 2f_c^x f_c^y \cdot [\text{III}_{fsx}(f^x) \text{III}_{fsy}(f^y) +$$

$$- \text{III}_{fsx}(f^x - f_c^x) \text{III}_{fsy}(f^y - f_c^y)]$$

If one uses the sample values of the first one of the two offset rasters of Equation 5a, a densely filled spatial frequency spectrum results in which the individual partial spectra abut one another without overlapping.

However, the spectra at $\pm f_c^x$ obtained in the signal after horizontal bandwidth limitation for transmission may considerably influence the picture quality for the compatible receiver (additional flicker noise, cross color). These signal components which result in interference in the compatible receiver are now reduced in that their spectra are reduced in amplitude with the aid of offset modulation in an offset modulation module OMB. Such an offset modulation module OMB is disclosed in German Patent Application No. P 3,344,524.9 Wendland et al and counterpart U.S. Application Ser. No. 06/680,292. Equation 5b now shows the possibility of such reduction by differently weighting the offset rasters according to Equation 5a. The reduction of $\frac{1}{3}$ of the amplitude of the base signal required according to German Patent Application No. P 3,344,524.9, results, for example, if the sample values of the first raster are weighted with $\frac{2}{3}$ and those of the second raster are weighted with $\frac{1}{3}$. The partial spectra at $f^x=0$ have the same amplitude as if only the first raster of Equation 5a were used, but the amplitude of the partial spectra at $\pm f_c^x$ is only $\frac{2}{3} - \frac{1}{3} = \frac{1}{3}$.

Figure 7:
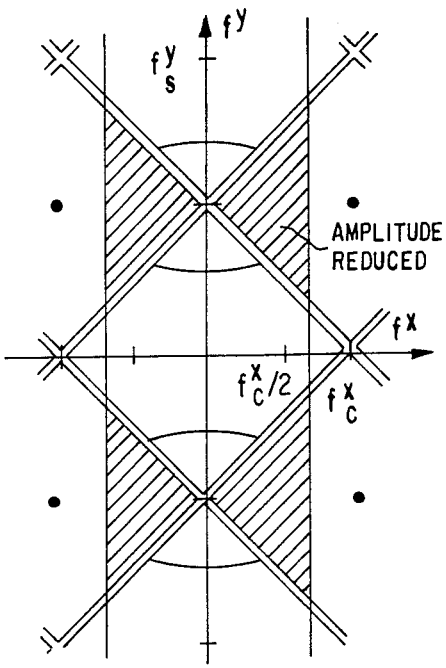
FIG. 7 shows the spatial frequency domain spectrum after digital offset modulation and horizontal bandwidth limitation.
Figure 8:
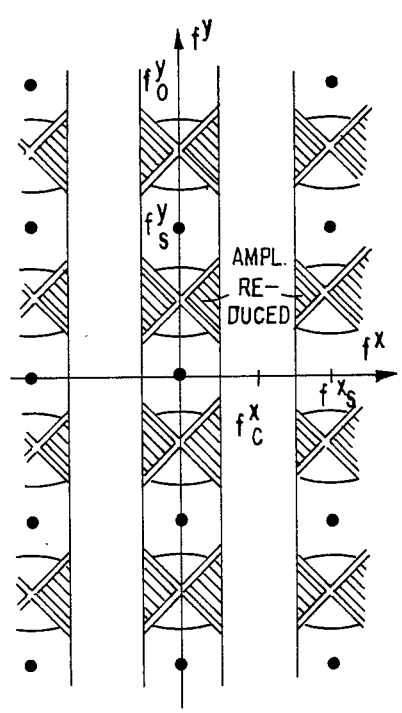
FIG. 8 shows the spatial frequency domain spectrum after Nyquist filtering and horizontal sampling with $f_s^x$.

The spatial frequency spectrum after this digital offset modulation and after horizontal band limitation to the bandwidth of the transmission channel is shown in FIG. 7, where the portions of the reduced amplitude partial spectra are shown in hatching. This full frame signal is transmitted in a synthetic line interlace method in two successive fields of the 625-line interlace system. Since the picture signal is present in digital form at the output of the offset modulation module OMB and the assumed transmission channel is an analog channel of the 625-line standard television system, a D/A conversion must be made by means of D/A converter DA2 subsequent to the offset modulation. This D/A converter DA2 is followed by a lowpass filter TP2 which limits the offset modulated picture signal, now present in analog form, to the bandwidth of the transmission channel ÜK, e.g. to 5.5 MHz. In the receiver, the incoming signal is band limited with the aid of a Nyquist filter Nq with $f^x{}_{6dB} = f_c^x/2 \dot= 4$ MHz. This makes it possible to properly place the partial spectra against one another during demodulation of the offset signal. The sampling required for digital processing of this signal is effected by means of A/D converter AD3, as at the transmitter, in an orthogonal raster, with the spacing of the sampling locations in the horizontal direction $x_s$ likewise corresponding to the spacing $y_s$ between the lines of the 625-line system. With the aid of a frame store, Bsp, two successive fields are combined into a full frame. The spectrum of this full frame signal is shown in FIG. 8. The basic stripe which is horizontally band limited at the input by Nyquist filter Nq appears in periodic repetition at multiples of the horizontal sampling frequency $f_s^x$.

Figure 9:
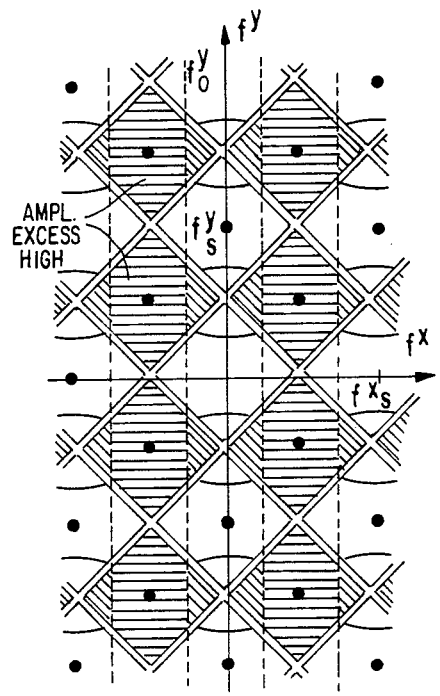
FIG. 9 shows the spatial frequency domain spectrum after offset demodulation.

The offset demodulation now takes place, like the offset modulation at the transmitter, by correspondingly weighting the partial offset rasters, into which the orthogonal sampling raster can be divided according to Equations 5a and 5b. With a weighting factor of 2 for the first offset raster and a weighting factor of $-1$ for the second one of the two offset rasters, the spatial frequency spectrum shown in FIG. 9 results. The amplitude of the signal spectra at multiples of $f_s^x$ remains unchanged $(2+(-1)=1)$ while at $f_c^x \pm n \cdot f_s^x$ the input signal spectrum is offset vertically by $f_c^y$ and weighted with the factor $2-(-1)=3$. The additional offset spectrum and the base band signal have now been recombined again at the same amplitude 1.

Planar reconstruction filtering is effected similar to the bandwidth limitation at the transmitter by means of two series-connected one-dimensional diagonal filters $D_{F3}$ and $D_{F4}$. However, due to the excessively high amplitude of the signal spectra to be suppressed as a result of the offset demodulation, increased demands are placed on the stop band attenuation of the filters. The sample values of the pulse responses of the two diagonal filters $D_{F3}$ and $D_{F4}$ lie, in the spatial domain, on diagonals $x=y$ and $x=-y$, respectively.

Thus, referring to FIG. 10, during the first diagonal filtering, only sample values from one of the two offset rasters of Equation 5a are utilized for the calculation of a pixel. This offers the possibility, as shown in FIG. 1, of performing the offset demodulation, in offset demodulator ODB, subsequent to this first filtering. However, for the calculation of the output data of the second diagonal filter $D_{F4}$, frame data from both rasters are employed. However, if the pixel data weighted with the even filter coefficients $c_0, c_{\pm 2}, \ldots$ of the second diagonal filter $D_{F4}$ and those weighted with the odd coefficients $c_{\pm 1}, c_{\pm 3}, \ldots$ are summed separately, the offset demodulation can even be postponed until the last addition in the second filter. As shown in FIG. 1, the offset demodulation ODB is part of diagonal filter $D_{F4}$.

FIG. 10 shows the sampling grid at the input of diagonal filter $D_{F3}$ consisting of two offset-rasters, mutually offset (denoted by ○ and □ respectively). The vertical spacing of adjacent samples is $y_s$, the line spacing of the 625-line picture, the horizontal spacing is $x_s$. For the calculation of a pixel value, diagonal filter $D_{F3}$ sums up the data of the picture elements on the ascending diagonal shown, weighting them with the corresponding filter coefficients ($c_o, c_{\pm 1}, c_{\pm 2}, \ldots$).

FIG. 10, upper region, shows the calculation of a pixel value at in-raster position; FIG. 10, lower region, the calculation of a pixel value at an intermediate position. Obviously for the calculation of one pixel only sample values out of one of the two offset-rasters are used.

FIG. 11 shows the spatial frequency spectra after the first diagonal filtering, FIG. 12 after the subsequent offset demodulation and FIG. 13 after the second diagonal filtering. The output signal of the second filter $D_{F4}$ is a high definition offset signal whose base band spectrum has the same resolution in the direction of horizontal and vertical spatial frequencies. After D/A conversion by means of digital/analog converter DA4, and after horizontal bandwidth limitation by means of lowpass filter TP3 and finally after vertical filtering by means of the transfer function of the display monitor M, the periodic spectra are reduced to such an extent that the observer has the impression of a line-free display with a horizontal resolution which is clearly improved over conventional transmission methods.

In the discussion above, it has been assumed that the scanning of the optical image at the transmitter was done progressively by the high definition camera, i.e. without line interlace, with 625 lines at 1:1. Within 40 msec, one frame is thus scanned twice without line offset. Of these two identical frames, concerning their spatial position, only the first one is processed further. If the optical image is instead scanned by a high line number camera, operating in the line interlace mode and employing two line offset fields per 40 msec, it is additionally necessary to insert a standards converter, in the embodiment according to FIG. 1, which must be done downstream of A/D converter AD1. The 1249-line, 2:1 signal of the high line number camera thus becomes a 1250 line, 2:1 signal composed of two 625-line fields.

One advantageous possibility for implementation of the method according to the present invention will be shown below for television transmission systems employing motion adaptive picture control.

The advantage of full frame transmission, improved reproduction of high vertical spatial frequencies and, in conjunction with offset transmission, broadening the transmissible range of horizontal spatial frequencies, does, however, limit motion resolution to the transmission of 25 motion phases, or increments, per second. Faster movement, particularly of high contrast picture regions, appears jerky. The publication entitled "High Quality Television By Signal Processing", 2nd International Conference on New Systems and Services in Telecommunications, Liege, November, 1983, describes a television transmission system in which this interference is avoided by fading over to transmission of 50 motion phases/second in picture regions containing much movement. However, in this transmission mode, successive fields can no longer be combined into a full frame so that the transmissible resolution for vertical spatial frequencies is limited to one-half the number of lines of a field and, due to the elimination of offset transmission, the transmissible horizontal resolution is limited to the bandwidth of the transmission channel. Conditions are similar for the motion adaptive picture control system disclosed in DE No. 3,233,882 A1.

Figure 14:
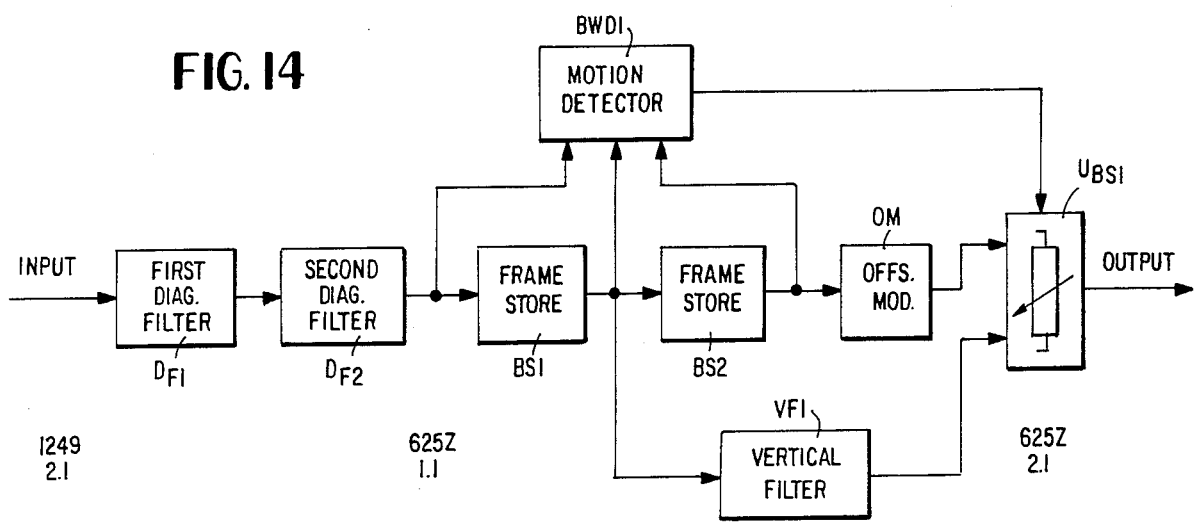
FIG. 14 is a block circuit diagram of a signal processing system at the transmitter with motion adaptive resolution control and offset transmission.

To avoid field aliasing errors whose interfering effect is even augmented by the increased vertical resolution of the high definition camera, an additional vertical band limitation at the transmitter is absolutely necessary for this transmission mode. The block circuit diagram of the processing system with motion adaptive resolution control is shown in FIG. 14.

The picture signal generated by the high definition camera, with 1249 lines, at 2:1, is initially diagonally band limited field by field, as described. The output signal of the digital planar filter, composed of diagonal filters $D_{F1}$ and $D_{F2}$, 625 lines at 1:1, is delayed in two frame stores, BS1 and BS2, and motion detection is performed by means of motion detector BWD1. Signal components outside the maximum transmissible spatial frequency range can thus not adversely influence motion detection. With the aid of the second frame store BS2, the synthetic line interlace signal is generated for full frame transmission and is thereafter offset modulated by means of offset modulator OM. Vertical filter VF1 takes over the additional vertical band limitation of the already diagonally prefiltered picture signal to half the sampling frequency of a field of the 625-line system, with only the field raster to be transmitted being calculated. Controlled by motion detector BWD1, a fade-over is made between the offset modulated full frame signal with synthetic line interlace and the vertically band limited line interlace signal. A fade-over circuit UBS1 is provided for this purpose. Picture sampling of the signal in FIG. 14, and digital processing are realized similarly to the embodiment of FIG. 1.

Figure 15:
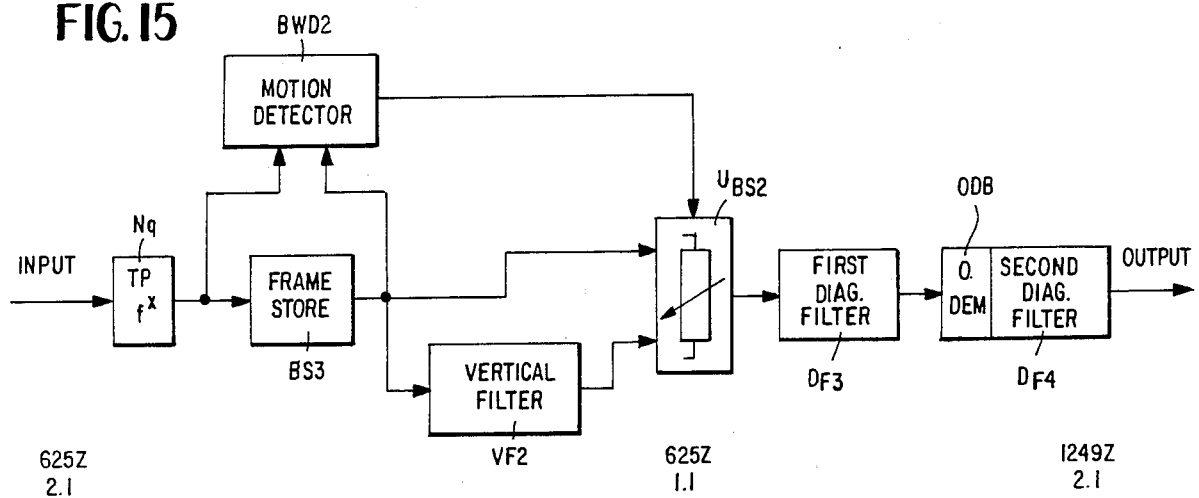
FIG. 15 is a block circuit diagram of a signal processing system at the receiver with motion adaptive resolution control and offset transmission.

The basic circuit diagram of the improved receiver is shown in FIG. 15. The received picture signal, band limited horizontally by means of Nyquist filter Nq, is initially delayed in a frame store BS3. This frame store, is used for motion detection by motion detector BWD2 and permits simultaneous access to two successive fields. Controlled by motion detector BWD2, a fade-over is made by means of fade-over device UBS2 between the full frame output signal of frame store BS3 and the full frame derived by way of lowpass filtering in vertical filter VF2 from the respective actual field.

With the two diagonal filters $D_{F3}$, $D_{F4}$ calculating a first field of the 1249-line, 2:1 output signal, vertical filter VF2 works on those lines of the picture signal at the output of frame store BS3 which belong to a first field of the 625-line, 2:1 input signal.

The full frame signal at the output of vertical filter VF2 is bandwidth limited to $|f^y| \leq f_c^y$. Subsequent offset demodulation in conjunction with planar diagonal band limitation by means of diagonal filters $D_{F3}$ and $D_{F4}$ and offset demodulation module ODB remains without influence on this signal. Thus, additional motion adaptive control of the diagonal filters at the receiver and of the offset demodulation is not necessary. Digital sampling of the analog transmitted picture signal with prefiltering and postfiltering will be discussed in connection with FIG. 16.

A circuit realization of the television system with motion adaptive resolution control will now be described. Since the function blocks of transmitter and receiver have the same configuration in the television system being described, the discussion is limited to the circuit realization at the receiver.

Figure 16:
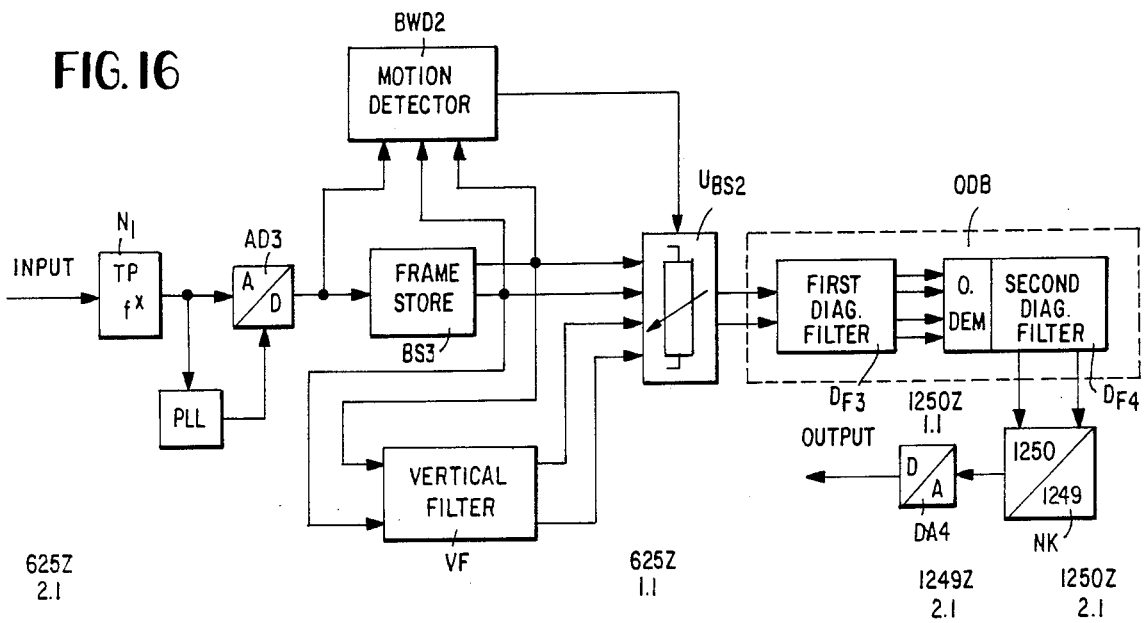
FIG. 16 is a detailed block circuit diagram of a signal processing system at the receiver.

The block circuit diagram of the receiver circuit is shown in FIG. 16. After analog Nyquist filtering at $f^x_{6dB}=f_c^x/2 \doteq 4$ MHz by means of Nyquist filter N1, the incoming picture signal is analog/digital converted in A/D converter AD3. The sampling frequency of converter AD3 is 16 MHz $\doteq F_s^x$. The phase of this 16 MHz sampling clock pulse is regulated by means of a PLL circuit during the transmission of the reference line so that transmitter and receiver sampling rasters coincide. A circuit as disclosed in German Application No. P 3,414,271, and counterpart Plantholt et al U.S. Application Ser. No. 06/722,364, can be used for this synchronization process. The digitalized picture signal is then read into frame store, BS3, at whose output two successive picture fields are available simultaneously. Motion detection by means of motion detector BWD2 is effected as described for example, in "ntz Archiv", Volume 4 (1982), No. 10, at pages 313-321, via this frame store by evaluation of the motion difference between successive frames. Vertical filter VF following at the output of frame store BS3 is configured as a transversal filter. Alternating from field to field, this filter calculates a full frame from the lines of the first and second field rasters, respectively, at its input. Due to the fact that the unprocessed signal is obtained at the line delay chain of the vertical filter, the expenses for delay compensation between vertically filtered and unprocessed signal remain low. In dependence on the control signal of motion detector BWD2, a fade-over is made between these two signals by means of switch $U_{BS2}$.

As already mentioned, offset demodulation occurs only within the second diagonal filter $D_{F4}$. Demodulation is here effected by different weighting of the sample values of the two offset rasters of Equation 5a. The weighting of the partial rasters might drastically broaden the signal value range to be processed, as shown by the illustrated example for raising the additional spectrum by a factor of 3. Offset demodulation of the input of the first diagonal filter $D_{F3}$ forces expansion of the data word length from 8 to 10 bits. The added expense for the subsequent diagonal filters would be considerable. By shifting the offset demodulation to the last summation in the second diagonal filter $D_{F4}$, the required expansion of the word length remains practically without effect.

Downstream of the output of the second diagonal filter $D_{F4}$, there occurs a standard conversion from 1250 lines at 2:1 to 1249 lines at 2:1 in a standards converter NK and digital/analog conversion by means of D/A converter DA4. Filtering, required analogously to FIG. 1, and display on the monitor are not shown in FIG. 16.

Figure 17:
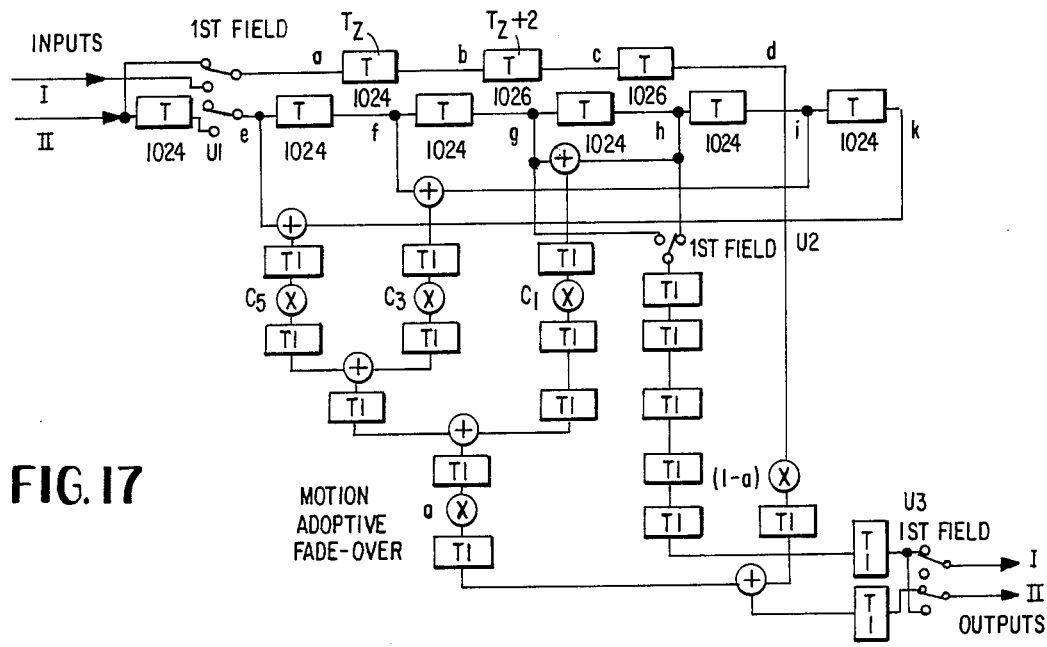
FIG. 17 is a circuit diagram of the vertical filter with fade-over network for motion adaptive field interpolation at the receiver.

The basic structure of vertical filter VF including the motion detector controlled fade-over circuit is shown in FIG. 17, where $\tau_1$ identifies the delay members which produce a unit time delay, i.e. a delay corresponding to the duration of one pixel, $\tau_{1024}$ identifies delay members providing a delay by 1024 pixels, i.e. one picture line, and $\tau_{1026}$ identifies delay members providing a delay by 1026 pixels, i.e. one picture line + 2 pixels.

Frame store BS3 simultaneously feeds one line of the first field I of the incoming picture signal and the line of the associated second field II spatially therebelow to the inputs I and II of vertical filter VF.

In the illustrated position of switches U1, U2 and U3, the signal present at input I is delayed by selected delay elements in the delay chain of the filter, but otherwise reaches output I unchanged in form. With the aid of multipliers, a fade-over can now be made between the output of lines filtered vertically out of the lines of the first field ($\alpha=1$) and the original lines of the second field ($\alpha=0$) at output II of the vertical filter.

For the following description of the principle of operation of the vertical interpolation filter the horizontal delay of $6\tau_1$ caused by the pipeline registers and the corresponding compensational delays is disregarded.

Picture data p[l] of line l, a first field line, at the filter input I and data p[l+1] of line l+1, a second field line, yield the following picture data at the terminals a ... d and 1 ... k of the two delay chains and at the filter outputs:

(1) switches $U_1$, $U_2$, $U_3$ in their position shown (the diagonal filters actually calculate a first field of the 1249-line, 2:1 receiver output signal)

$$a: p[l + 1] \ b: p[l - 1] \ c: p[l - 3] \ d: p[l - 5]$$

$$e: p[l] \ f: p[l - 2] \ g: p[l - 4] \ h: p[l - 6] \ i: p[l - 8] \ k: p[l - 10]$$

output I: $p_I[l - 6] = p[l - 6]$ output II: $p_{II}[l - 5] = (1 - \alpha) \cdot p[l - 5] +$ $\alpha \cdot (c_1 < p[l - 4] + p[l - 6] > + c_3 < p[l - 2] + p[l - 8] > +$ $c_5 < p[l] + p[l - 10] > )$ The vertical filter thus outputs the incoming first field data (output I) and depending on the control signal $\alpha$ ($0 \leq \alpha \leq 1$), generated by the motion detector, the corresponding second field data ($\alpha=0$) or a second field interpolated out of the incoming first field picture data ($\alpha=1$) (output II).

(2) switches $U_1$, $U_2$, $U_3$ in their other position (the diagonal filters actually calculate second field picture data)

$$a: p[l] \ b: p[l - 2] \ c: p[l - 4] \ d: p[l - 6]$$

$$e: p[l - 1] \ f: p[l - 3] \ g: p[l - 5] \ h: p[l - 7] \ i: p[l - 9] \ k: p[l - 11]$$

output I: $p_I[l - 6] = (1 - \alpha) \cdot p[l - 6] +$ $\alpha(c_1 < p[l - 5] + p[l - 7] > + c_3 < p[l - 3] + p[l - 9] > +$ $c_5 < p[l - 1] + p[l - 11] > )$ output II: $p_{II}[l - 5] = p[l - 5]$ The vertical filter now outputs the incoming second field picture data (output II) and at output I depending on the control signal $\alpha$ the corresponding first field picture data ($\alpha=0$) or a first field interpolated out of the incoming second field picture data ($\alpha=1$).

Figure 18:
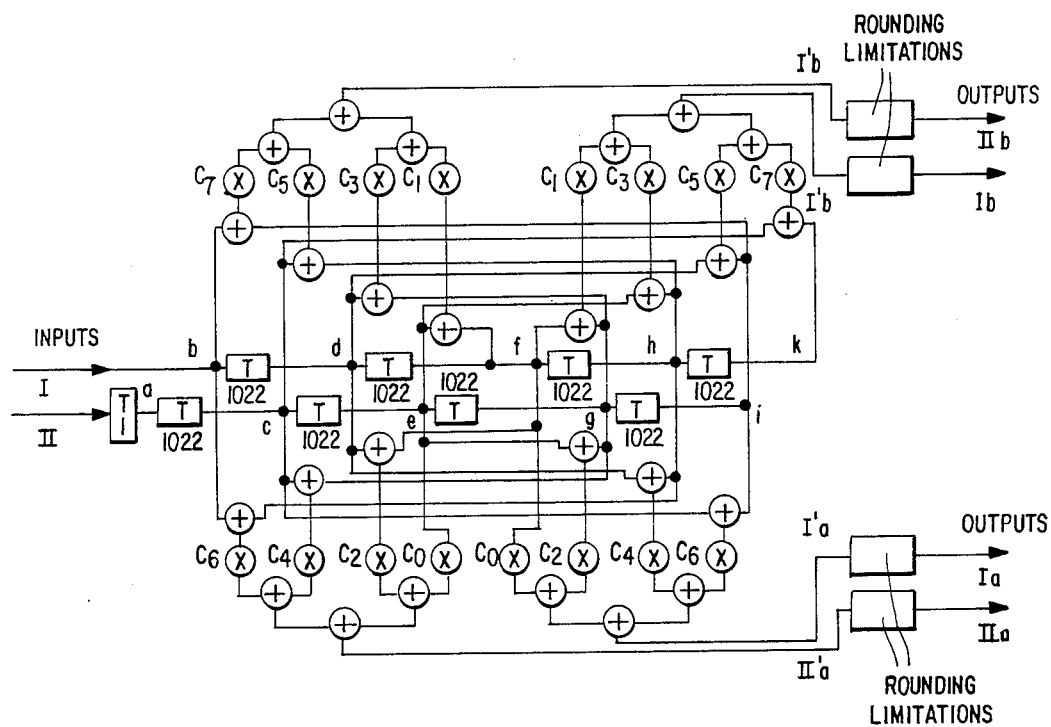
FIG. 18 is a simplified circuit diagram of the first diagonal filter for digital planar band limitation at the receiver.
Figure 19:
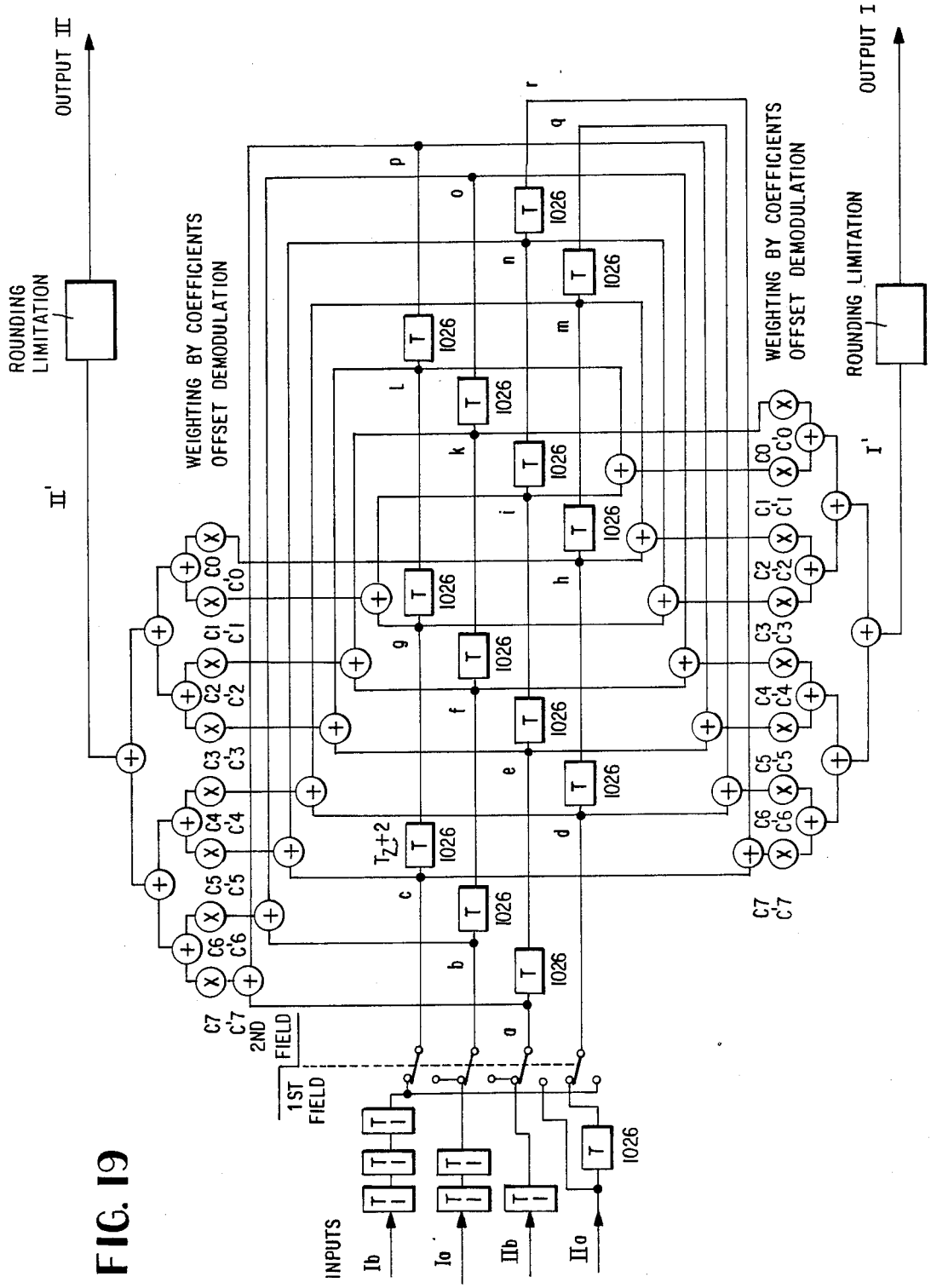
FIG. 19 is a simplified circuit diagram of the second diagonal filter for digital planar band limitation at the receiver.

Multiplications of picture data and filter coefficients are achieved by calling up the multiplication results from result tables stored in programmable read only memories. The fade-over between interpolated and incoming field data is achieved by means of hardware multipliers. Exemplary values for the filter coefficients:
$c_1 = 0.60555804$
$c_3 = -0.1446713$
$c_5 = 0.0391136$ FIGS. 18 and 19 show the configuration of the two diagonal filters $D_{F3}$ and $D_{F4}$, each with 15 coefficients. Due to the elementary delay $\tau_1$ by one pixel at input II of filter $D_{F3}$ of FIG. 18, it is not the data of two vertically adjacent pixels which simultaneously reach the inputs of the two $\tau_{1022}$ delay chains, but rather the data of two diagonally adjacent pixels. The delay of each delay member $\tau_{1022}$ of this first diagonal filter is 1 line minus 2 pixels so that the data for pixels which are adjacent one another in the direction of the ascending diagonal are available simultaneously at the in/outputs of the delay members $\tau_{1022}$. Since the first diagonal filter $D_{F3}$ receives the picture data of two lines of a 625-line full frame in parallel, the simultaneous calculation of four locally adjacent lines in the high line number image is required at the filter output. However, only either the even numbered coefficients $c_0$, $C_{\pm 2}$, ... —the calculated pixel lies in the input sampling raster—or the odd numbered coefficients—for the intermediate raster—are required for the calculation of a pixel. The sampling locations of the four pixel data of the high line number intermediate image emitted simultaneously by the first filter lie in the spatial domain in the direction of the ascending diagonal.

Figure 18A:
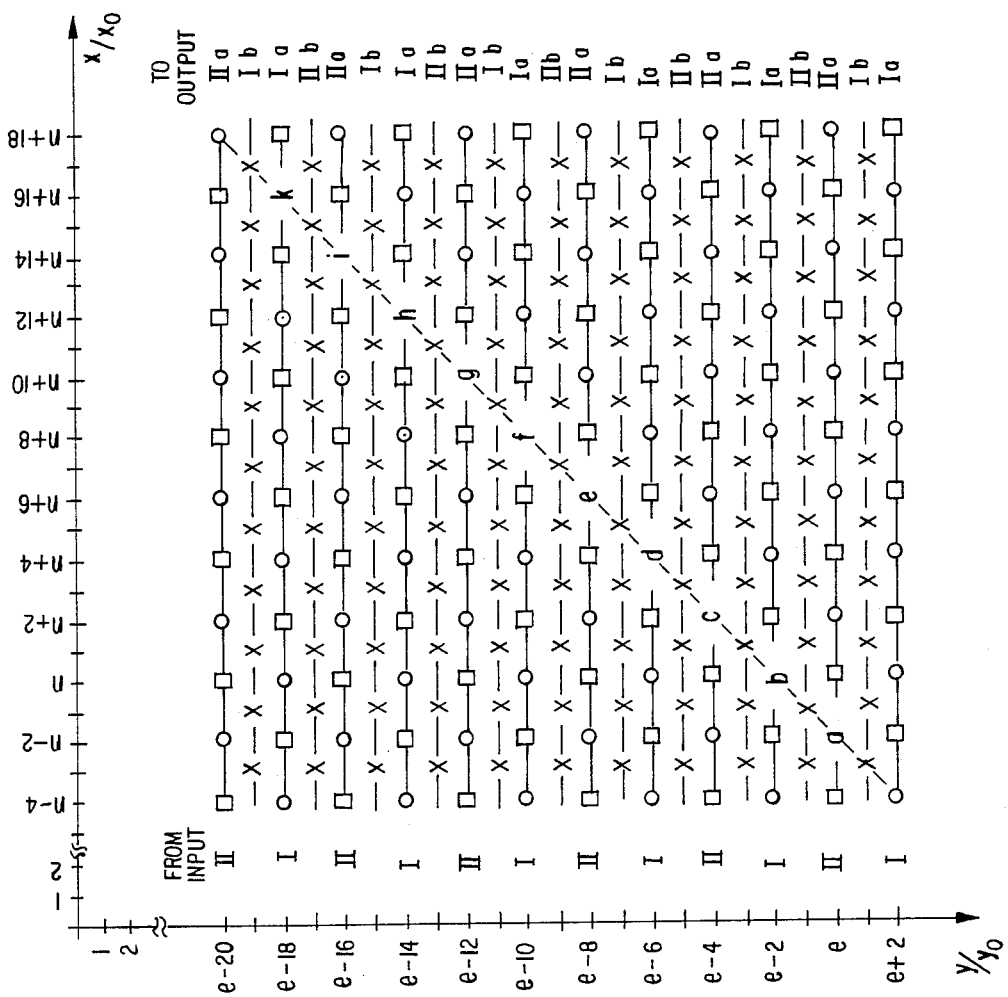
FIG. 18a shows the spatial relationship between input and output signals of the diagonal filter DF3 with pixel data used for output data evaluation marked by letters.

FIG. 18a shows the principle of operation of the first diagonal filter $D_{F3}$. The letters along the ascending diagonal mark the spatial position of the picture data, simultaneously available at the terminals of the two delay chains of FIG. 18, when pixel data p(n,l) is applied to input II and data $p(n,l-2)$ applied to input I of the filter $D_{F3}$.

The filter signals I'a, I'b, II'a, II'b prior to rounding and limitation are calculated as follows:

$$I'b: p_o[n+9, 1-11] = \sum_{k=-7}^{7} c[k] \cdot p[n+9+k, 1-11-k]$$

$$I'a: p_o[n+8, 1-10] = \sum_{k=-7}^{7} c[k] \cdot p[n+7+k, 1-9-k]$$

$$II'b: p_o[n+7, 1-9] = \sum_{k=-7}^{7} c[k] \cdot p[n+7+k, 1-9-k]$$

$$II'a: p_o[n+6, 1-8] = \sum_{k=-7}^{7} c[k] \cdot p[n+6+k, 1-8-k]$$

As $c[-k]=c[k]$ and $p[n+a, 1-b]=0$ for a, b odd:

$$I'b: p_o[n+9, l-11] = c_1 \cdot < p[n+8, l-10] +$$
$$p[n+10, l-12] > + c_3 \cdot < p[n+11, l-8] +$$
$$p[n+12, l-14] > + c_5 \cdot < p[n+4, l-6] +$$
$$p[n+14, l-16] > + c_7 \cdot < p[n+2, l-4] +$$
$$p[n+16, l-18] >$$

$$I'a: p_o[n+8, l-10] = c_o \cdot p[n+8, l-10] +$$
$$c_2 \cdot < p[n+6, l-8] + p[n+10, l-12] > +$$
$$c_4 \cdot < p[n+4, l-6] + p[n+12, l-14] > +$$
$$c_6 \cdot < p[n+2, l-4] + p[n+14, l-16] >$$

To reduce the word length of the filter output signals Ia, ..., II$_b$ the filter signals I'a, ..., II'b are subsequently rounded and limited.

Referring to FIG. 19, pixel delays $\tau_1$ and line delays $\tau_{1026}$ at the input end of the second diagonal filter $D_{F4}$ cause the sampling locations for the pixels processed in this filter to lie in the direction of the descending diagonal. The elementary delays of the four delay chains of the second filter amount to 1 line + 2 pixels. The picture signal at the filter output is a 625-line signal. The high line number display (interlaced) is achieved by field-by-field switching of the signals at the input of the second filter so that alternatingly one field in the input 625-line sampling raster and a second field in the horizontally and vertically offset intermediate raster is calculated. If the switches remain in the illustrated position for both fields, the second diagonal filter calculates only the picture data in the original raster of the 625-line input signal for full frame reproduction at 625 lines, 1:1.

Figure 19A:
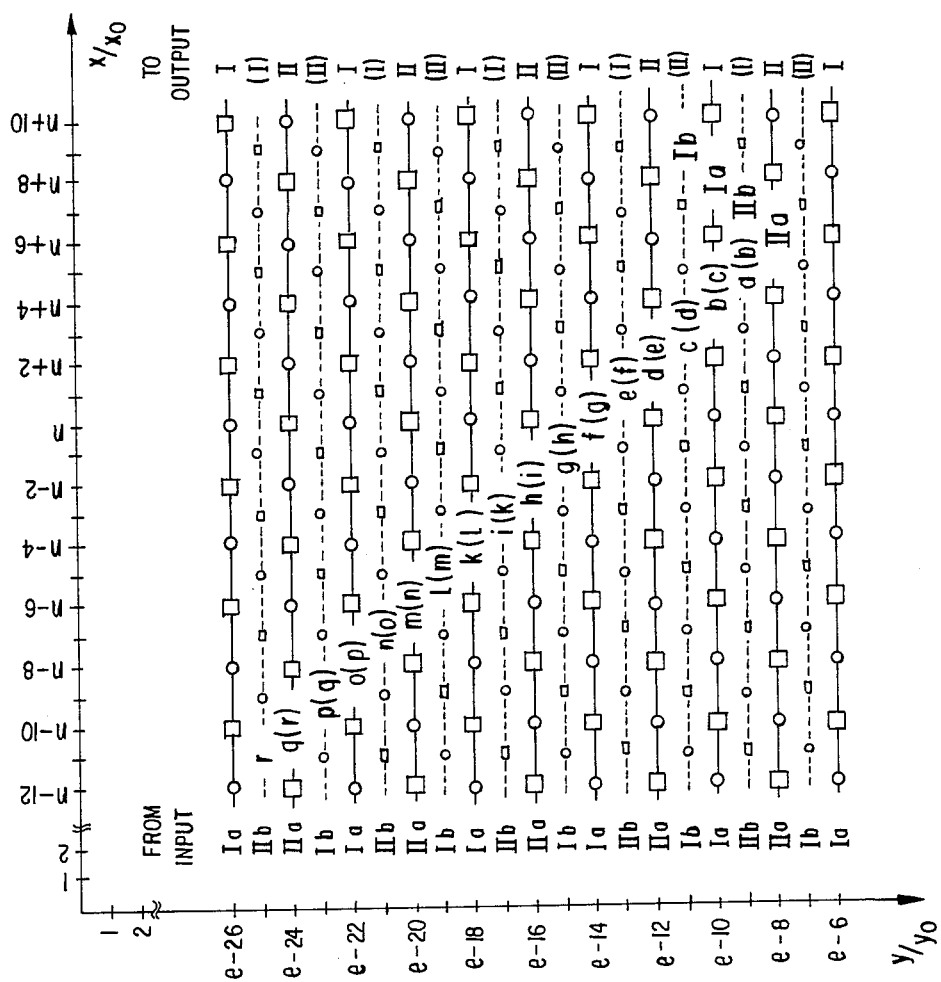
FIG. 19a shows the spatial relationship between input and output signals of the diagonal filter DF4 with pixel data used for output data evaluation marked by letters.

FIG. 19a shows the principle of operation of the second diagonal filter $D_{F4}$. The letters along the descending diagonal correspond to the terminals of the delay chains of FIG. 19 marking the spatial position of the picture data, simultaneously available at that terminals, when pixel data p $[n+6, 1-8]$ is applied to input IIa, p $[n+7, 1-9]$ to input IIb, p $[n+8, 1-10]$ and p $[n+9, 1-11]$ to inputs Ia and Ib respectively. The terms in brackets are valid, if the switches (FIG. 19) are in their other position, and thus the diagonal filter $D_{F4}$ is calculating the second field of the 1249-line, 2:1 signal at the receiver output.

The filter signals I' and II' prior to rounding and limitation are calculated as follows:

$$I': p_o[n-4, 1-18] = c_o \cdot p[n-4, 1-18] +$$
$$\sum_{k=1}^{7} c[k] < p[n-4-k, 1-18-k] +$$
$$p[n-4+k, 1-18+k] >$$

$$II': p_o[n-2, 1-16] = c_o \cdot p[n-2, 1-16] +$$
$$\sum_{k=1}^{7} c[k] < p[n-2-k, 1-16-k] +$$
$$p[n-2+k, 1-16+k] >$$

As mentioned above, offset demodulation is performed by differentially weighting the picture data of the two offset rasters according to Equations 5a and 5b.

According to FIG. 19a, the picture data subsequentially weighted with even filter coefficients $c_o$, $c_2$ ... belong to the first offset raster (denoted by -O-) and those data weighted with the odd filter coefficients $c_1$, $c_3$, ... belong to the second offset raster (denoted by -□-). Depending on the raster position of the pixel actually calculated, the above relation is reversed. Thus two alternatingly used special coefficient sets $c_o$, $c_1$, ... $c_7$ and $c_0'$, $c_1'$, ... $c_7'$ are necessary in order to combine filtering operation and offset demodulation.

| $D_{F3}$ = coefficient set | $D_{F4}$ coefficient sets | |
|---|---|---|
| $c_o = 0.45228636$ | $c_o = 0.90457272$ | $c_o' = -0.45228636$ |
| $c_{\pm 1} = 0.32646954$ | $c_{\pm 1} = -0.32646954$ | $c_{\pm 1}' = 0.65293908$ |
| $c_{\pm 2} = 0.06615172$ | $c_{\pm 2} = 0.13230344$ | $c_{\pm 2}' = -0.06615172$ |
| $c_{\pm 3} = -0.08333072$ | $c_{\pm 3} = 0.08333072$ | $c_{\pm 3}' = -0.16666144$ |
| $c_{\pm 4} = -0.06368522$ | $c_{\pm 4} = -0.12737044$ | $c_{\pm 4}' = 0.06368522$ |
| $c_{\pm 5} = 0.00448392$ | $c_{\pm 5} = -0.00448392$ | $c_{\pm 5}' = 0.00896784$ |
| $c_{\pm 6} = 0.02139041$ | $c_{\pm 6} = 0.04278082$ | $c_{\pm 6}' = -0.02139041$ |
| $c_{\pm 7} = 0.00237725$ | $c_{\pm 7} = -0.00237725$ | $c_{\pm 7}' = 0.0047545$ |

FIG. 20 shows the processing of color components in accordance with this invention.

The three color signals $R_1$, $G_1$, $B_1$, at the output of the high line number camera C are processed in a matrix M1 to yield luminance signal $y_1$ and color difference signals $U_1$ and $V_1$ respectively. Luminance and chrominance processing takes place separately, where luminance processing is in accordance with the present invention. Chroma processing CP 1 includes standards conversion (1249, 2:1 to 625, 2:1) and appropriate filtering. Before transmission via a standard transmission channel CH, luminance signal $Y_2$ and encoded chrominance signals $C_1$ are combined by means of summation S to form the CCVS signal.

At the input of the receiver luminance signal $Y_3$ and chrominance signal $C_2$ are separated by luminance-chrominance-separator LCS. Luminance post processing is in accordance with the present invention.

The chroma signal $C_2$ is decoded by the color decoder CDEC producing the color difference signals $U_3$ and $V_3$, which are subsequently post processed, including standards conversion (625, 2:1 to 1249, 2:1) and appropriate filtering. Finally luminance signal $Y_4$ and the two color difference signals $U_4$ and $V_4$ are recombined by means of matrix M2 leading to the high line number signals $R_2$, $G_2$, $B_2$ displayed by the monitor MON.

Concerning the principle of construction and operation, the diagonal filters $D_{F1}$ at the transmitter and $D_{F3}$ at the receiver are identical. They only differ in the number of coefficients, which is increased to 21 at filter $D_{F1}$ of the transmitter. The same is holding for the diagonal filters $D_{F2}$ and $D_{F4}$ respectively with the addition that the transmitter filter $D_{F2}$ is only equipped with one set of coefficients equal to that of diagonal filter $D_{F1}$ as offset modulation and filtering are separated at the transmitter.

A set of exemplary values for the coefficients of the two diagonal filters $D_{F1}$ and $D_{F2}$ is given below:

$c_0 = 0.45634222$ $c_{\pm 1} = 0.30991167$ $c_{\pm 2} = 0.03701019$ $c_{\pm 3} = -0.08751804$ $c_{\pm 4} = -0.03038228$ $c_{\pm 5} = 0.03750864$ $c_{\pm 6} = 0.02169751$ $c_{\pm 7} = -0.01591363$ $c_{\pm 8} = -0.01329349$ $c_{\pm 9} = 0.00601140$ $c_{\pm 10} = 0.00679702$

The operations performed by vertical filter VF1 at the transmitter and that performed by vertical filter VF2 at the receiver are principally different. While the vertical filter VF1 is operating on the base a 625-line picture at its input, alternatingly calculating a first field and a second field of the 625-line, 2:1 transmission signal, the vertical filter VF2 at the receiver performs the inverse operation, calculating a 625-line picture out of one transmitted field.

Nevertheless the circuit according to FIG. 17 is used for the vertical filter VF1 with the following modifications:

As output II is used as the only output of the filter, switch $U_2$, the subsequent delay chain, and switch $U_3$ are omitted. The function of switch $U_1$ now is inverse, the vertical filter VF1 is calculating a second field with switch $U_1$ in the position shown. The multiplication factor $\alpha$ is set to 0.5 with $(1-\alpha)=0.5$ now representing filter coefficient $c_0$. At least the multiplication with factor $\alpha$ can be avoided by generating a new set of coefficient values $c_1$, $c_3$, $c_5$ under consideration of $\alpha=0.5$.

A set of exemplary values for the filter coefficient of vertical filter VF1 is given below:

$c_0 = 0.5$ $c_{\pm 1} = 0.30277902$ $c_{\pm 3} = -0.07233565$ $c_{\pm 5} = 0.01955680$

After line-by-line parallel/series conversion, which doubles the clock pulse frequency to 32 MHz, and subsequent scan conversion (standards conversion) by means of device NK from 1250 to 1249 lines at 2:1, a standard high definition line interlaced signal is present at the output of digital/analog converter DA4.

Identical delay units equipped with read-write memories are used for the above-described transversal filters and are able to store up to 1024 pixels at clock frequencies up to 16 MHz. The elementary delay required for the various filter devices is realized by addressing the memories in a line-by-line shift depending on the direction of the filter.

The pixel data at the terminals of the delay chains are weighted by calling up the multiplication results from result tables stored in programmable read only memories. In order to be able to realize weighting factors other than integer numbers without additional hardware for the purpose of offset demodulation within the second diagonal filter, the weighting is taken into account by the evaluation of the two different sets of coefficients, $c_0, \ldots c_7$; $c_0', \ldots c_7'$. The processing word length of 16 bits within the filter offers sufficient reserves so that additional expansion of the word length is not required.

In order to simplify understanding of the present invention, its description herein has been given without consideration of color television transmission. The invention can of course also be used for color television systems in which the processed luminance signal is combined with the separately processed color components to form a compatible CCVS signal.

It will be understood that the above description of the present invention is susceptible to various modifications, changes and adaptations, and the same are intended to be comprehended within the meaning and range of equivalents of the appended claims.

What is claimed is:

1. A method for increasing image resolution in a compatible television system, in which system an optical image is scanned along vertically spaced horizontal raster lines by a high line number television camera, the resulting picture signal is subjected to a horizontal frequency band limitation for further digital processing, said method comprising, at a transmitter:
sampling the resulting picture signal in the direction of horizontal frequencies in the spatial domain with a horizontal sample spacing corresponding to the vertical spacing between adjacent lines of the resulting picture signal;
effecting two-dimensional filtering of the sampled picture signal with respect to two mutually transverse diagonals of the scanned image;
offset modulating the filtered picture signal and band limiting the filtered picture signal to a selected bandwidth to produce a modified picture signal containing components capable of causing interference in a compatible receiver;
imparting to the components capable of causing interference a relatively reduced amplitude;
transmitting the signal which has been offset modulated, band limited and to which has been imparted relatively reduced amplitude components over a transmission channel to a receiver and, at a receiver:
subjecting the signal arriving from the transmission channel to band limitation in the direction of horizontal spatial frequencies by means of a Nyquist filter;
sampling the signal leaving the Nyquist filter in an orthogonal raster, with a horizontal sample spacing corresponding to the vertical spacing between adjacent lines of the signal received at the receiver;

combining the received signal portions associated with two successive picture fields into a picture frame signal;

effecting a first one-dimensional filtering of the resulting picture frame signal with respect to a first diagonal of the image represented by the picture frame signal;

offset demodulating the signal resulting from the first filtering while effecting relative amplitude increase of those components to which a relative amplitude reduction had been imparted before transmission;

effecting a second one-dimensional filtering of the offset demodulated signal with respect to a second diagonal transverse to the first diagonal; and band limiting the two-dimensionally filtered signal before delivery to a television monitor.

2. Method as defined in claim 1 wherein said step of effecting two-dimensional filtering is effected by two series-connected one-dimensional filters.

3. Method as defined in claim 1 in a television transmission system effecting motion adaptive picture control, wherein said step of offset modulating is performed only with respect to picture regions which represent stationary or slowly moving image portions, and further comprising transmitting signals associated with rapidly moving image portions with reduced horizontal and vertical spatial resolution and increased time resolution.

* * * * *